US012798180B2

(12) United States Patent
Habibpour et al.

(10) Patent No.: US 12,798,180 B2
(45) Date of Patent: Nov. 17, 2026

(54) METHOD FOR MANUFACTURE OF CUSTOM OBJECT COMPLEMENTARY TO VEHICLE EXTERIOR SURFACE DEFECT

(71) Applicant: Illinois Tool Works Inc., Glenview, IL (US)

(72) Inventors: Mehdi Habibpour, Glenview, IL (US); Rick Turpin, Glenview, IL (US); Carlton Seaboldt, Glenview, IL (US); Grant Shouldice, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 458 days.

(21) Appl. No.: 18/238,554

(22) Filed: Aug. 28, 2023

(65) Prior Publication Data

US 2024/0075683 A1 Mar. 7, 2024

Related U.S. Application Data

(60) Provisional application No. 63/403,035, filed on Sep. 1, 2022.

(51) Int. Cl.
*B29C 64/165* (2017.01)
*B29C 64/393* (2017.01)
(Continued)

(52) U.S. Cl.
CPC .......... *B29C 64/165* (2017.08); *B29C 64/393* (2017.08); *B33Y 50/02* (2014.12);
(Continued)

(58) Field of Classification Search
CPC ... B29C 64/165; B29C 64/393; B29C 73/105; B29C 73/24; B29C 2035/0827;
(Continued)

(56) References Cited

U.S. PATENT DOCUMENTS

2007/0165939 A1* 7/2007 Savareigo ............ G01N 21/956 382/145
2016/0297149 A1* 10/2016 Albert .................... B33Y 50/02
(Continued)

FOREIGN PATENT DOCUMENTS

CN 113085230 A 7/2021

OTHER PUBLICATIONS

Int'l Search Report for PCT/US2023/031337, dated Nov. 27, 2023.

*Primary Examiner* — Charles Cai
(74) *Attorney, Agent, or Firm* — MaxGoLaw PLLC

(57) ABSTRACT

A method for repairing a defect in a vehicle exterior body surface is provided that includes a scan data set being generated that corresponds to the dimensional surface boundaries of the defect. A manufacturing data set is created for an object at least in part complementary to the defect from the scan data. The object is formed from the manufacturing data set with a layered manufacturing device. The object is joined to the defect to repair the vehicle exterior body surface. An object is also provided formed of a thermoplastic or a UV cured polymer with a shape that is at least at least in part complementary to a defect vehicle exterior body surface. The object having a void therein with the shape configured to receive an insert or a fastener therein.

20 Claims, 5 Drawing Sheets

(51) Int. Cl.

| | |
|---|---|
| ***B33Y 50/02*** | (2015.01) |
| ***B33Y 80/00*** | (2015.01) |
| ***G06T 7/00*** | (2017.01) |

(52) U.S. Cl.
CPC ............ *B33Y 80/00* (2014.12); *G06T 7/0004* (2013.01); *G06T 2207/30252* (2013.01)

(58) Field of Classification Search
CPC ......... B29C 73/04; B29C 73/10; B29C 73/02; B29C 64/386; B33Y 50/02; B33Y 80/00; B33Y 10/00; B33Y 50/00; G06T 7/0004; G06T 2207/30252; B29L 2031/3005; G05B 2219/49018; G05B 19/4099
See application file for complete search history.

(56) References Cited

U.S. PATENT DOCUMENTS

| | | | | |
|---|---|---|---|---|
| 2017/0142276 | A1* | 5/2017 | Lacagnina | H04N 13/275 |
| 2018/0059644 | A1* | 3/2018 | Lection | G05B 19/4099 |
| 2020/0166907 | A1* | 5/2020 | Frederick | B33Y 10/00 |
| 2020/0307096 | A1* | 10/2020 | Simonin | B29C 64/386 |
| 2021/0230878 | A1* | 7/2021 | Pina | E04F 13/18 |
| 2021/0331394 | A1* | 10/2021 | Seubert | B33Y 10/00 |
| 2022/0073766 | A1 | 3/2022 | Habibpour et al. | |
| 2023/0218319 | A1* | 7/2023 | Zander | A61B 17/888<br>606/304 |
| 2024/0189859 | A1* | 6/2024 | Nakajima | B05C 17/00593 |
| 2024/0190067 | A1* | 6/2024 | Calvin | B29C 64/118 |
| 2026/0036528 | A1* | 2/2026 | Rudd | G01N 21/954 |

* cited by examiner

METHOD FOR MANUFACTURE OF CUSTOM OBJECT COMPLEMENTARY TO VEHICLE EXTERIOR SURFACE DEFECT

RELATED APPLICATIONS

This application is a non-provisional application that claims priority benefit of U.S. Provisional Application Ser. No. 63/403,035 filed 1 Sep. 2022; the contents of which are hereby incorporated by reference.

FIELD OF THE INVENTION

The present invention in general relates to vehicle body repair and in particular to custom components complementary to the vehicle body defect and methods of forming the same.

BACKGROUND OF THE INVENTION

Body filler compositions are used in the vehicle repair aftermarket industry to repair of deformities such as holes and dents in vehicle bodies. The filler composition cures following application to the deformity and upon reaching a level of hardness, the resulting coating overlying the defect is sanded and finished with suitable painting steps to affect the repair of the vehicle body.

The process requires considerable skill and time as each successive layer of the repair is completed. The quality of the repair to return a vehicle exterior surface to the original class A surface finish of a new vehicle is only possible when the underlying layers are free of pinholes, cracks and other defects. The ability to achieve such a result is further complicated by varying conditions associated with the various layers deployed as to factors including mix thoroughness of two-part compositions, cure temperature, substrate preparation, and application to the substrate. Curative steps that must be employed when a given layer has pinholes, sags, or is sanded prematurely all add to the complexity and cost of quality repair.

Layered manufacturing machines such stereolithography (SL), selective laser sintering (SLS), fused deposition modeling (FDM), laminated object manufacturing (LOM), and three-dimensional Printing (3D printing) are now commercially available. Layered manufacturing is routinely used in industrial and medical prototyping and for medical prototyping. U.S. Pat. Nos. 5,490,962 and. 5,370,692 are exemplary of these efforts. These techniques and the required differences in materials have yet to be exploited to complete vehicle exterior body repairs.

There further exists a need for a method of using layered manufacturing techniques to complete a vehicle exterior body repair. There further exists a need for a system for performing such a repair.

SUMMARY OF THE INVENTION

A method for repairing a defect in a vehicle exterior body surface is provided that includes scan data set being generated that corresponds to the dimensional surface boundaries of the defect. A manufacturing data set is created for an object at least in part complementary to the defect from the scan data. The object is formed from the manufacturing data set with a layered manufacturing device. The object is joined to the defect to repair the vehicle exterior body surface.

An object is also provided formed of a thermoplastic or a UV cured polymer with a shape that is at least at least in part complementary to a defect vehicle exterior body surface. The object having a void therein with the shape configured to receive an insert or a fastener therein.

BRIEF DESCRIPTION OF THE DRAWING

The present invention is further detailed with respect to the following drawings. These figures are not intended to limit the scope of the present invention but rather illustrate certain attribute thereof wherein.

DETAILED DESCRIPTION OF THE PREFERRED EMBODIMENTS

Figure 1:
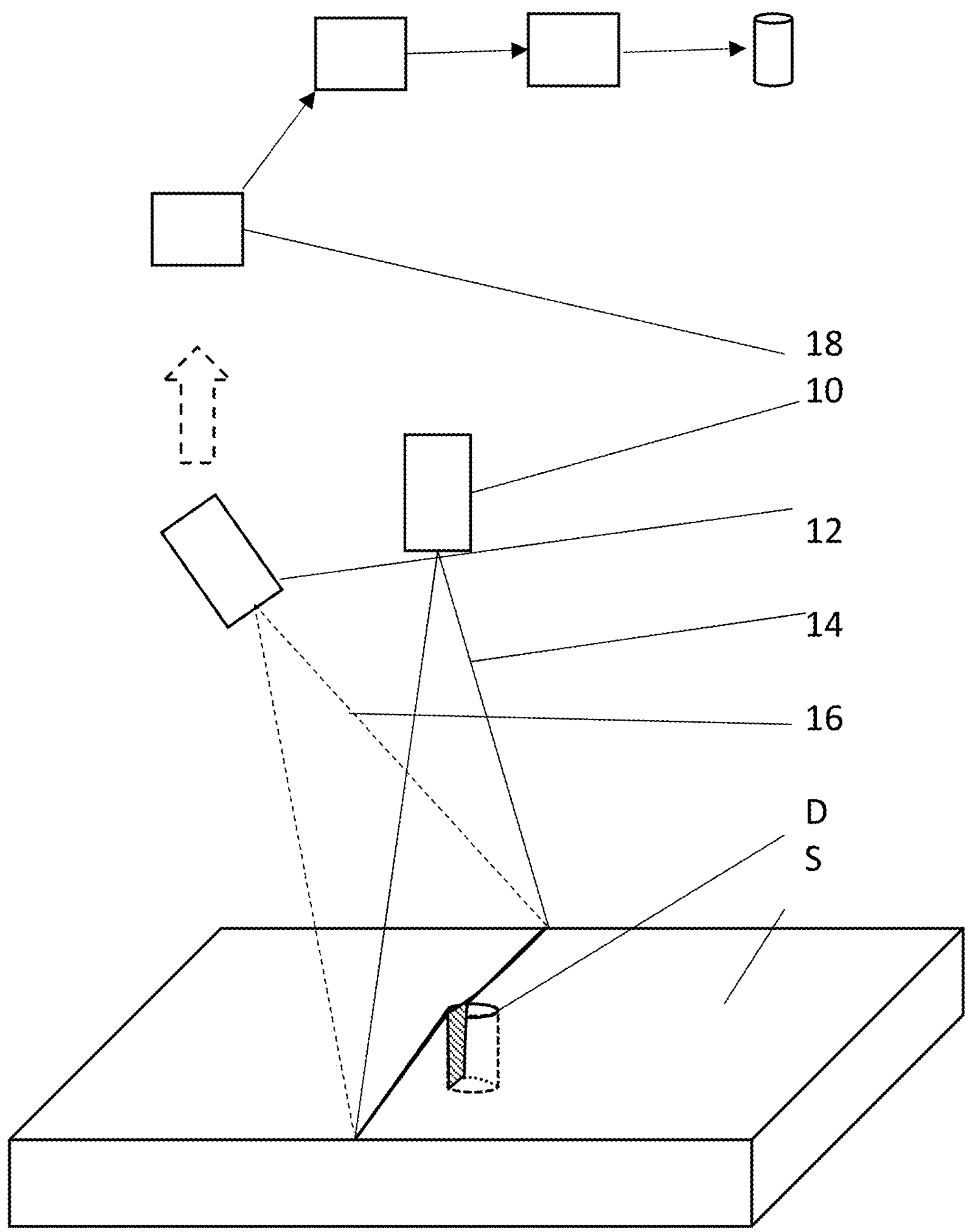
FIG. 1 is schematic perspective view of a vehicle exterior surface having a deft therein being dimensionally scanned.

The present invention has utility as method for repairing a vehicle exterior surface defect. The situs of the defect is dimensionally scanned to create a scan data set that in turn is used to produce by layer manufacturing an object complementary to the defect and formed of a substance compatible with vehicle exterior repairs and amenable to overcoating with primers and paints conventional to vehicle exterior repairs.

A vehicle exterior surface defect amenable to repair by the present invention illustratively includes a dent, a scratch, a puncture. or combinations thereof. In some inventive embodiments, the defect is prepared. Preparation illustratively includes cleaning with solvents, or gases to remove loose debris, debriding or otherwise removing debris therefrom, sanding to increase the surface area of the defect, or a combination thereof.

Since layered manufacturing involves printing in layers, it requires instructions in which a multi-dimensional digital model is mathematically translated into a series of slices of narrow thickness, each slice having a set of data or printing instructions representing the part geometry at that particular plane of the defect. In three-dimensional printing, each slice corresponds to a layer of material during construction of the object. The entire set of data or instructions is referred to as the machine instructions.

The slices which are the manufacturing instructions bear a general resemblance to the scan planes which make up a visual or light detection and ranging scan. The scan of the defect is readily accomplished with a smartphone or tablet device operating an application such as Scann3d, Trnio, Qlone, Bevel; or a devoted light detection and ranging scanner such as ARTEC® Space Spider. Regardless of the scanner employed resolutions of 0.05 to 0.1 mm are routinely achieved. Upon scanning the defect, a scan data set is obtained that defines as a set of dimensional slices. The slices in the scan data can be used in manufacturing instructions as is in some inventive embodiments, while in other embodiments, processed data contains additional information. By way of example, additional information in the manufacturing slices illustratively includes different sources of polymerizable material that vary as to one or more property (i.e. viscosity, cured strength, curing depth, wavelength of the curing light, print head speed, print head point-to-point spacing, or a combination thereof). The slices that are the manufacturing instructions in some inventive embodiments are spaced at the layer thickness of resin polymerization, rather than at the scan planes interval of the scan data. In fact, the polymerization depth with an ultraviolet (UV) curable resin spacing interval is smaller than the scan plane interval of the scan data Additionally, it should be appreciated that the angular orientation at which the manufacturing slices are taken does not need to have any particular orientation with respect to the angular orientation of the scan data planes. The scan planes are for convenience of imaging, and the manufacturing slices are for convenience of manufacturing. By way of example, scan data is collected as to convenience of access to the defect and lighting thereof, while manufacturing of an object complementary thereto may be advantage in an inverted form or any other angle to facilitate stability of the object as being formed. This will be further detailed with respect to the drawings. In contrast, the print instructions for any given coordinate location are in many cases essentially binary, instructing particular dispensers to either dispense or not dispense.

Generating the machine instructions includes mathematically taking a cross-section of the digital model at locations corresponding to the layers of the three-dimensional printing process. The machine instructions describe the entire interior solid structure of the part, while the digital model describes the surface limits thereof. Generating the machine instructions for each coordinate point or voxel in the printing region include determining whether that coordinate point is to be polymerized solid or left as a void in the final object. By way of example, a channel for receipt of an insert or fastener complementary void is created.

As used herein, a voxel is a unit of graphic or physical modeling information that defines a point in three-dimensional space. For example, in 3-D space, each of the coordinates may be defined in terms of its position, color, and density. Voxels are defined as the smallest individually addressable element in layered manufacturing applications.

The motion of the printhead as it moves along the fast axis can be considered a line or a ray that intersects the digital model. This is especially true for raster printing, in which the motion of the printhead is always along a straight line, as opposed to vector printing, in which the motion of the printhead can be a curved path. That intersection can be mathematically calculated to indicate for each point or printing location along the ray whether that point should have a dispense command or no command. This process is called ray casting, and basically amounts to mathematically calculating intersections between lines and the digital model. For example, each intersection point between the ray and the surface can be characterized as an entry or an exit. If an entry point has already been reached but no exit point has been reached along that ray, then all points on the ray between entry and exit are part of the solid and require dispensing of polymerizable material. Special cases can also be recognized for situation such as tangency where a ray touches but does not really enter a solid body. Thus, the machine instructions include instructions to dispense or not to dispense polymerizable liquid at each of many locations in the printing plane, usually in a grid format.

In another embodiment, more than one binder or dispensed liquid may be involved in order to dispense different substances at different locations. To accomplish this, the independent instructions for each available polymerizable composition instruct whether to dispense or not to dispense at a particular location. As a result, the machine instructions at each possible printing point are a series of binary (i.e., yes-or-no) instructions for each of the available dispensers.

In some types of printheads it is even possible to vary the amount of liquid dispensed at a given print command by varying the electrical waveform driving the dispenser. The technologies providing capability include piezoelectric printheads and microvalve based printheads. In such a case, additional information would have to be associated with each print command in the machine instruction file.

As a result, in addition to the geometric data, the machine instruction file also contains compositional information relating to the situation where more than one polymerizable substance is dispensed to form a solid region in the resulting object being formed complementary to the defect.

The present invention affords a method of manufacturing an object that is a dimensionally matching complement to a vehicle exterior surface defect. As a result, the object is simply secured in the defect and the exposed surface of the object overlayered to complete repair without resort to the layering of fillers, pin hole correcting compounds and the sanding conventional to such repairs. Furthermore, internal microarchitecture and composition of the object can be designed to provide regions of different properties within the object or alternative the defect can be repaired with multiple objects that may have similar or disparate properties between objects. Using the machine instruction file, the object is manufactured such as by a layered manufacturing technique. It is then inspected either on-site or shipped to location of the vehicle. The object being inspected for dimensional accuracy and acceptable levels of imperfections as to air bubbles and the like. Ideally, no such imperfections are present.

The resulting object upon being secured with an adhesive into the defect is amenable to overcoating with substances functioning as topcoats, primers, or paints.

Depending on the processing method, the polymer forming the object can be a solution, as in the case of UV curable compositions, or in particle or strand form for thermoplastic substances. In the first method, the polymer must be photopolymerizable. In the latter methods, the polymer is preferably in particulate form and is solidified by application of heat, solvent, or adhesive.

The particles can be of any shape, including fibrous or rod shaped, although a more spherical particle will typically flow more smoothly. The particles are typically in the range of ten microns or greater in diameter.

Exemplary thermoplastic polymers operative herein illustratively include acrylonitrile butadiene styrene (ABS), polylactic acid (PLA), high impact polystyrene (HIPS), polyethylene terephthalate glycol (PETG), polyamide, acrylonitrile styrene acrylate (ASA), polycarbonate, ethylene vinyl acetate, poly(anhydrides), polyorthoesters, and copolymers in which any of the aforementioned are present in an amount of at least 30% of the monomer subunits thereof.

Photopolymerizable polymers operative herein include those detailed in US Pat. Pub. No. US20220073764A1, acrylated and methacrylated-urethanes, -epoxies, and -polyesters.

Figure 2:
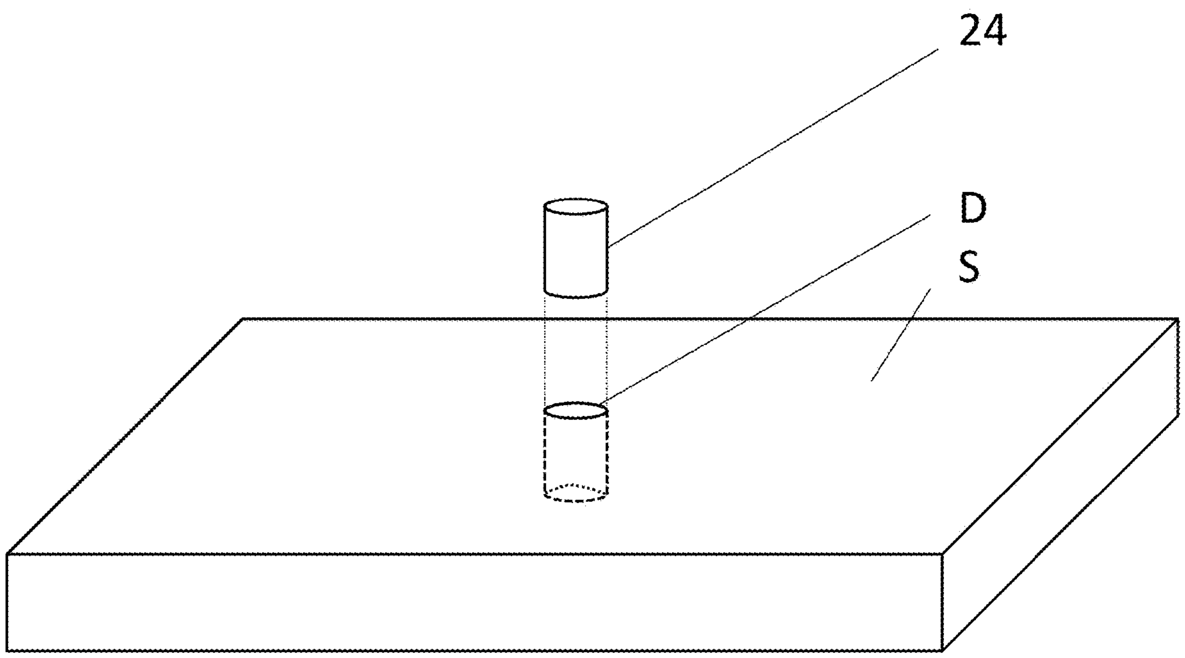
FIG. 2 is an exploded perspective view of a single object complementary to the dent of FIG. 1.
Figure 3:
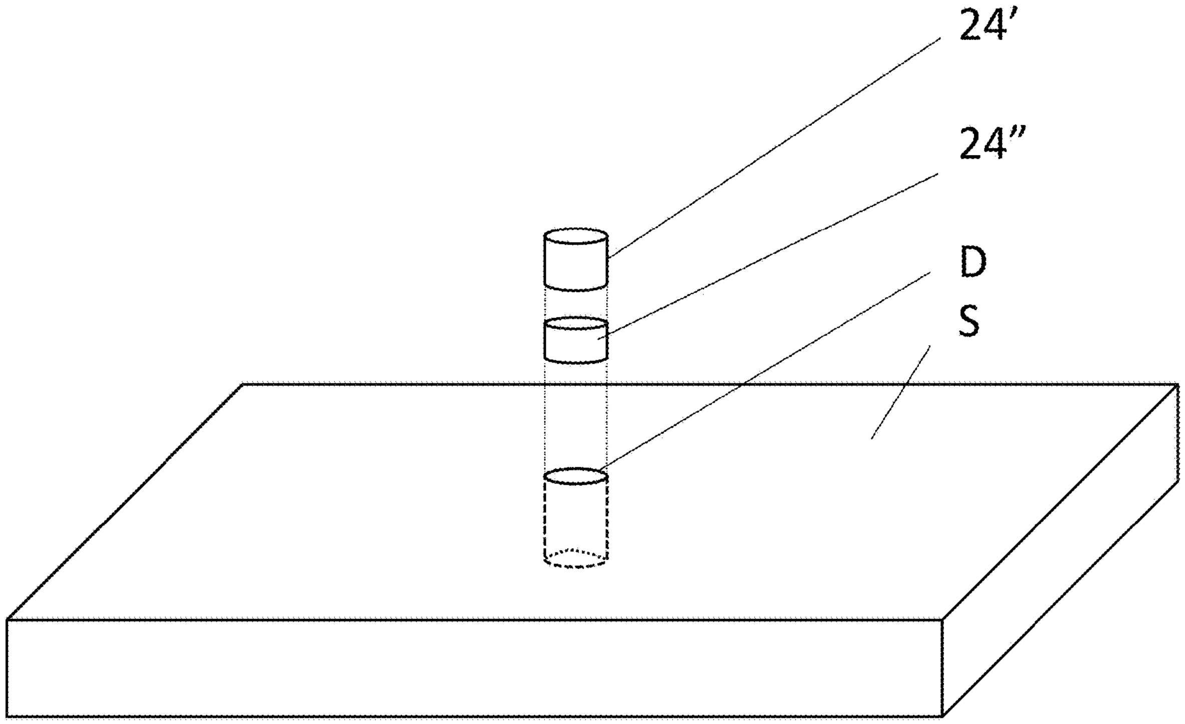
FIG. 3 is an exploded perspective view of two objects that in in combination are complementary to the dent of FIG. 1.

Referring now to the drawings, FIG. 1 is a schematic diagram depicting a defect, D in a vehicle exterior surface, S. The defect D is depicted as a geometrically symmetrical for visual clarity with the appreciation that such defects are typically irregular compression induced shapes and the surface is typical non-planar and with the contours common to components such as a vehicle hood, roof, side panel, trunk lid, bumper, or quarter panel. A light source 10 creates radiation 12 that irradiates the dent D. A detector 14 measures a reflection 14 of the radiation 12 from the dent D and the surrounding surface S. It is appreciated that the light source 10 illustratively includes a polychromatic and uncollimated source such as the sun, a light emitting diode, or an incandescent bulb; a monochromatic and collimated light source such as a laser. It is appreciated that the detector 14 can be a camera that collects multiple images with like or different wavelengths and stitches the images together. Alternatively, light detection and ranging is employed to reflect rastered laser beams to from the source 10 to the detector 14. It is further appreciated that the source and detector are present within a unitary device such as a table or smartphone. The detector 14 generates a scan data set 18 that contains the surface boundaries of the dent D and can be considered as a set of slices of dent boundary conditions or a three-dimensional set of boundary conditions of the dent D. The scan data set 18 is communicated to a manufacturing processor 19 than converts the scan data set 18 into a manufacturing data set 20. The communication being by wired or wireless transmission. The manufacturing data set 20 is used to control a layered manufacturing device 22 that produces an object 24. As shown in FIG. 2, the object 24 is complementary to the dent D. In still other embodiments of the present invention that are particularly well-suited for large or complex dents, multiple objects 24' and 24" are formed that in combination are complementary to the dent D, as shown in FIG. 3. It is appreciated that the objects 24' and 24" are produced from a unified scan data set 18 that is modified to form multiple object manufacturing data sets or each is produced from a separate data set.

Figure 4:
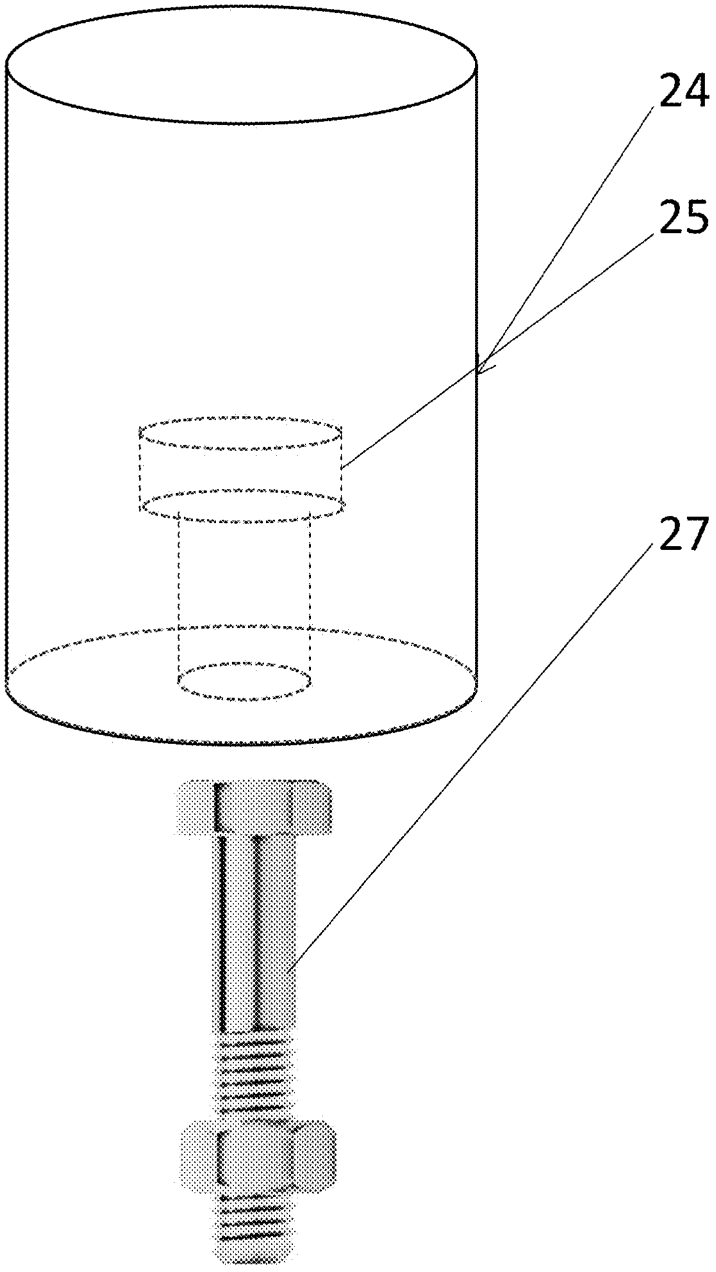
FIG. 4 is an exploded perspective view of an inventive object with a void and a component configured to be retained in the void.

In some inventive embodiments, an object 24" is formed with a void 25 configured to include a component 27 therein, as shown in FIG. 4 in exploded view. While the component 27 is depicted as a threaded fastener with a complementary nut, it is appreciated that the component 27 also includes a threaded nut alone, a bolt alone, a stem, or other conventional fastener, a magnet that can that facilitate self-adhesion to a steel vehicle surface, or ferromagnetic insert for use with a magnetic tool for precision placement of the object.

Figure 5:
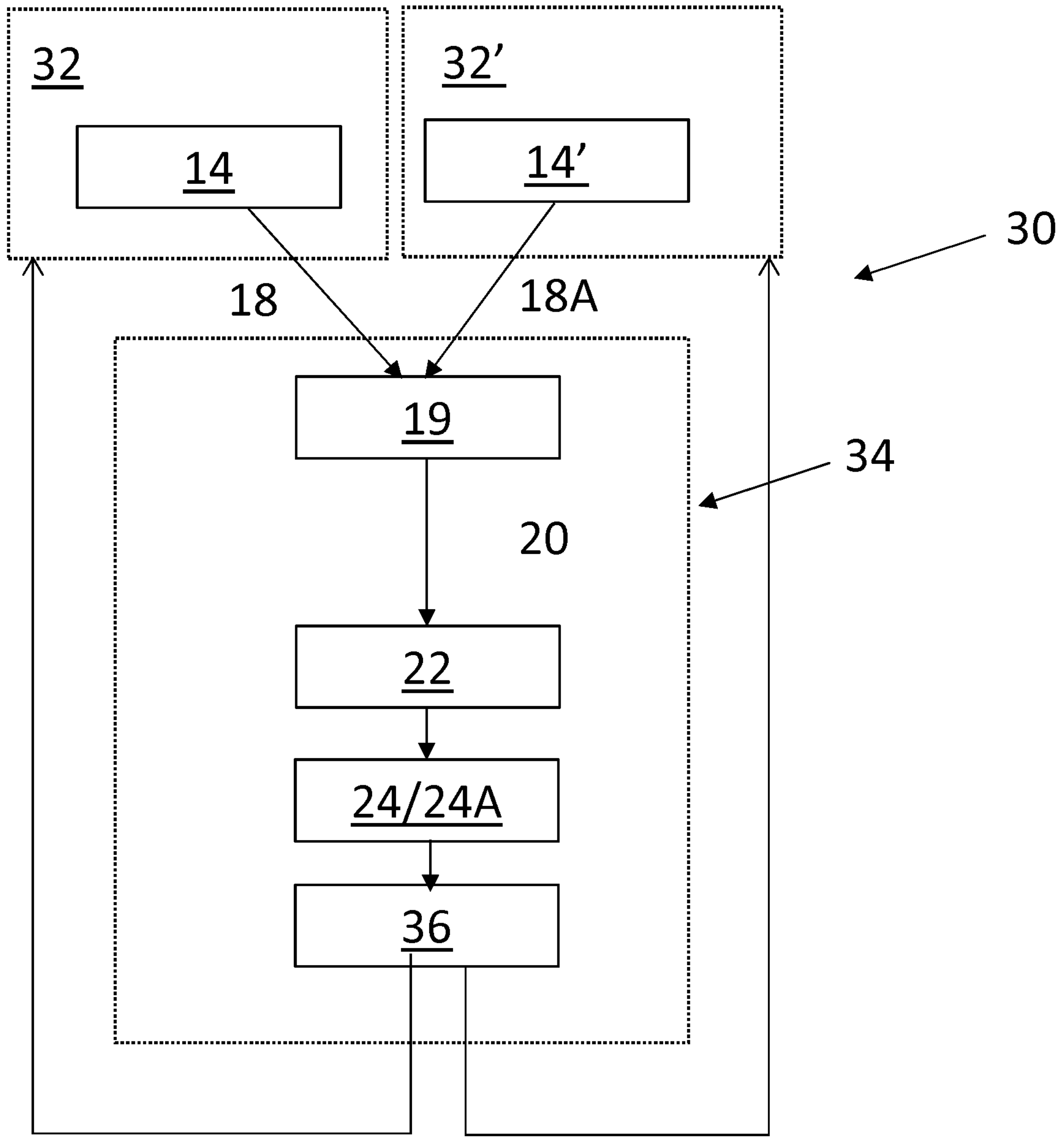
FIG. 5 is a schematic of steps employed in an exemplary method according to the present invention.

In some inventive embodiments, as shown in FIG. 5, a system is shown generally at 30 in which the aforementioned reference numerals have the meaning ascribed thereto with regard to the preceding drawings. A central site 34 receives dent specific data 18 or 18' from remote sites 32 and 32' that each have a detector 14 or 14'. It is appreciated that the detectors 14 and 14' need not be similar. The scan data sets 18 or 18' are readily transmitted through a website, a memory device shipment, or other conventional data transfer techniques. The detector scan data sets 18 and 18A are communicated to a processor 19 at the central site 34. The processor 19 communicates manufacturing data 20 to a layered manufacturing device 22 that in turn creates the objects 24 and 24A corresponding to scan data sets 18 and 18A, respectively. The central site 34 is involved in the manufacturing and shipping of objects to the ordering remote repair shop sites 32 and 32', respectively. The central site 34 can also receive and process product specifications and product design requirements for specific objects 24 and 24'/24". Alternatively, the functions of central site 30 are located proximal to the vehicle such as within a repair shop site 32 or 32'.

In some inventive embodiments, the central site 34 affords custom options as to the composition, color, and homogeneity of the object 24 or 24A being produced. For example, an object can be ordered inclusive of a component 27.

The central site 34 in some inventive embodiments executes various quality control operations in step 36, for example, ensuring that the specific object is a good fit to the scan data set 18 or 18' through digitizing to object, for example via a laser scanner, mechanical touch probe, or other geometry acquisition device. If the verification is unsuccessful, the object 24 or 24A is rejected and the process is repeated. If the verification is successful, the central site 34 ships the object 24 or 24A to the appropriate repair shop site 32 or 32'.

In contrast to a conventional vehicle exterior surface repair, upon receipt of the complementary object 24 or 24'/24", the objects are simply secured within the defect to form a continuous surface that approximates the surface prior to the defect. The object is readily secured through techniques that illustratively include mechanical fasteners simultaneously engaging the substrate and the object, adhesives, magnets, or a combination thereof. The exposed outward surface of the object is then subjected to conventional priming and painting. It is appreciated that the priming and painting can also extend to the vehicle exterior surface surrounding the object to as sure visual continuity thereacross.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The invention claimed is:

1. A method for repairing a defect in a vehicle exterior body surface comprising:
- generating a scan data set corresponding to the dimensional surface boundaries of the defect, wherein generating the scan data set comprises:
  - creating radiation with a polychromatic and uncollimated light source device;
  - irradiating the defect with the light source device; and
  - measuring a reflection of the radiation from the defect and a surrounding surface of the defect with a detector;
- creating manufacturing data sets for multiple sub-objects forming an object at least in part complementary to the defect from the scan data set, wherein each of the sub-objects has different property;
- forming the sub-objects from the manufacturing data sets with a layered manufacturing device; and
- joining the object formed by the multiple sub-objects to the defect to repair the vehicle exterior body surface.

2. The method of claim 1 wherein the scan data set is generated with a smartphone or a tablet.

3. The method of claim 1 wherein the scan data set is generated with light detection and ranging.

4. The method of claim 1 wherein the scan data set has a resolution of 0.05 to 0.1 mm.

5. The method of claim 1 further comprising wirelessly transmitting the scan data set to a manufacturing processor as input for the manufacturing data set.

6. The method of claim 5 wherein the manufacturing processor is remote from the vehicle exterior body surface at a central site.

7. The method of claim 1 wherein the object is formed from a thermoplastic.

8. The method of claim 7 wherein the thermoplastic is one of acrylonitrile butadiene styrene (ABS), polylactic acid (PLA), high impact polystyrene (HIPS), polyethylene terephthalate glycol (PETG), polyamide, acrylonitrile styrene acrylate (ASA), polycarbonate, ethylene vinyl acetate, poly (anhydrides), polyorthoesters, or copolymers in which any of the aforementioned are present in an amount of at least 30% of the monomer subunits thereof.

9. The method of claim 1 wherein the object is formed from a UV curable resin.

10. The method of claim 1 wherein the object is formed with a void therein configured to receive an insert or a fastener therein.

11. The method of claim 1 further comprising verifying dimensions of the object relative to the scan data set corresponding to the dimensional surface boundaries of the defect.

12. The method of claim 1 wherein the joining of the object to the defect is through an intermediate adhesive therebetween.

13. The method of claim 1 wherein the joining of the object to the defect is through a fastener simultaneously engaging the object and the vehicle exterior body surface.

14. The method of claim 1 further comprising forming another object at least in part complementary to the defect and the object and joining the other object to vehicle exterior body surface.

15. The method of claim 1 further comprising applying an overlayer of a primer or paint on the object alone or in combination with adjacent regions of the vehicle exterior body surface.

16. The method of claim 1 further comprising collecting multiple images with like or different wavelengths with the detector and stitching the images together.

17. A method for repairing a defect in a vehicle exterior body surface comprising:

generating a scan data set corresponding to dimensional surface boundaries of the defect, wherein generating the scan data set comprises:

creating radiation with a polychromatic and uncollimated light source device;

irradiating the defect with the light source device; and measuring a reflection of the radiation from the defect and a surrounding surface of the defect with a detector;

creating manufacturing data sets for multiple sub-objects forming an object at least in part complementary to the defect from the scan data set, wherein each of the sub-objects has different property;

forming the sub-objects from the manufacturing data sets with a layered manufacturing device, the object formed by the multiple sub-objects with a void therein configured to receive an insert or a fastener therein;

verifying dimensions of the object relative to the scan data set corresponding to the dimensional surf ace boundaries of the defect; and joining the object to the defect to repair the vehicle exterior body surface.

18. A method for repairing a defect in a vehicle exterior body surface comprising:

generating a scan data set corresponding to dimensional surface boundaries of the defect, wherein generating the scan data set comprises:

creating radiation with a polychromatic and uncollimated light source device;

irradiating the defect with the light source device; and measuring a reflection of the radiation from the defect and a surrounding surface of the defect with a detector;

creating manufacturing data sets for multiple sub-objects forming an object at least in part complementary to the defect from the scan data set, wherein each of the sub-objects has different property;

forming the sub-objects from the manufacturing data sets with a layered manufacturing device, the object formed by the multiple sub-objects with a void therein configured to receive an insert or a fastener therein; and joining the object to the defect through the insert or the fastener simultaneously engaging the object and the vehicle exterior body surface to repair the vehicle exterior body surface.

19. A method for repairing a defect in a vehicle exterior body surface comprising:

generating a scan data set corresponding to dimensional surface boundaries of the defect, wherein generating the scan data set comprises:

creating radiation with a polychromatic and uncollimated light source device;

irradiating the defect with the light source device; and measuring a reflection of the radiation from the defect and a surrounding surface of the defect with a detector;

creating manufacturing data set for an object at least in part complementary to the defect from the scan data set;

forming the object from the manufacturing data set with a layered manufacturing device, the object formed from a UV curable resin;

forming another object, which has different property than the object, at least in part complementary to the defect and the object; and joining the object to the defect and joining the other object to vehicle exterior body surface to repair the vehicle exterior body surface.

20. A method for repairing a defect in a vehicle exterior body surface comprising:

generating a scan data set corresponding to dimensional surface boundaries of the defect, wherein generating the scan data set comprises:

creating radiation with a polychromatic and uncollimated light source device;

irradiating the defect with the light source device; and measuring a reflection of the radiation from the defect and a surrounding surface of the defect with a detector;

creating manufacturing data sets for multiple sub-objects forming an object at least in part complementary to the defect from the scan data set;

forming the sub-objects from the manufacturing data set with a layered manufacturing device, the object formed by the multiple sub-objects from a UV curable resin and formed with a void therein configured to receive an insert or a fastener therein; and joining the object to the defect to repair the vehicle exterior body surface.

* * * * *